United States Patent
Muller et al.

(10) Patent No.: US 8,499,963 B2
(45) Date of Patent: Aug. 6, 2013

(54) CULINARY ARTICLE HAVING A CORROSION-RESISTANT AND SCRATCH-RESISTANT NON-STICK COATING

(75) Inventors: Pierre-Jean Muller, Saint Felix (FR); Laurent Voisin, Sales (FR)

(73) Assignee: SEB SA, Ecully (FR)

(*) Notice: Subject to any disclaimer, the term of this patent is extended or adjusted under 35 U.S.C. 154(b) by 249 days.

(21) Appl. No.: 12/742,774

(22) PCT Filed: Nov. 14, 2008

(86) PCT No.: PCT/FR2008/052058
§ 371 (c)(1), (2), (4) Date: Nov. 17, 2010

(87) PCT Pub. No.: WO2009/068832
PCT Pub. Date: Jun. 4, 2009

(65) Prior Publication Data
US 2011/0198357 A1    Aug. 18, 2011

(30) Foreign Application Priority Data
Nov. 16, 2007   (FR) ...................... 07 59122

(51) Int. Cl.
A47J 27/00 (2006.01)
A47J 36/00 (2006.01)
B05D 3/00 (2006.01)
B65D 1/40 (2006.01)

(52) U.S. Cl.
USPC .................. 220/573.2; 220/62.15; 220/573.1; 220/912; 427/299

(58) Field of Classification Search
USPC ............. 220/62.16, 62.15, 573.1, 573.2, 912; 427/299
See application file for complete search history.

(56) References Cited

U.S. PATENT DOCUMENTS

| | | | |
|---|---|---|---|
| 3,850,867 A | | 11/1974 | Hartmann |
| 4,250,215 A | * | 2/1981 | Mayer ........................ 206/524.3 |
| 5,455,102 A | * | 10/1995 | Tsai .............................. 428/141 |
| 6,382,454 B1 | | 5/2002 | Buffard et al. |
| 6,596,380 B1 | | 7/2003 | Buffard et al. |
| 2010/0140276 A1 | * | 6/2010 | Cuillery et al. ............ 220/573.2 |

FOREIGN PATENT DOCUMENTS

| | | |
|---|---|---|
| CA | 2246215 C | 3/1999 |
| WO | 0056537 | 9/2000 |

OTHER PUBLICATIONS

International Search Report from WO2009068832.
International Written Opinion from WO2009068832.

* cited by examiner

*Primary Examiner* — Anthony Stashick
*Assistant Examiner* — Madison L Poos
(74) *Attorney, Agent, or Firm* — Seyfarth Shaw LLP; Brian Michaelis

(57) ABSTRACT

The present disclosure relates to a culinary article including a metal substrate having a concave inner face intended to be placed on a side in which food can be introduced into the article and a convex outer face intended to be placed facing a heat source. The inner face being coated in succession, starting from the substrate, with a hard enamel base, which is rough and contains no lead or cadmium, and then with a non-stick coating covering the hard layer. The present disclosure also relates to a method of manufacturing such an article.

21 Claims, 1 Drawing Sheet

CULINARY ARTICLE HAVING A CORROSION-RESISTANT AND SCRATCH-RESISTANT NON-STICK COATING

RELATED CASE INFORMATION

This application claims benefit of PCT Application No. PCT/FR2008/052058, filed Nov. 14, 2008 which claims benefit of French Application No. 07/59122 filed Nov. 16, 2007 both of which are incorporated herein in their entireties.

FIELD OF THE INVENTION

The present invention generally concerns a cooking utensil whose bottom has a reinforced inner surface provided with a non-stick coating, having high corrosion and scratch resistance properties.

The manner in which the cooking utensil is manufactured with its reinforced inner surface is also concerned.

Conventionally, as non-stick coating on the inner surface of a cooking utensil, a coating is used containing a sintered fluorocarbon resin (e.g. PTFE). Said coatings are known not only for their non-stick properties but also for their resistance to attack by heat or chemicals.

More generally, cooking utensils whose bottom part has an inner surface with a non-stick coating have the advantage of being easy to clean and allow food to be cooked with little or no fat. However, said items have the major disadvantage that the non-stick coating is fragile.

By fragile coating in the meaning of the present invention is meant a coating which is likely to become scratched subsequent to attack of mechanical type such as that caused by too vigorous rubbing of the coating with a scouring pad, or which does not sufficiently protect a substrate of aluminium or aluminium alloy type from chemical attack caused by dishwasher detergents.

BACKGROUND OF THE INVENTION

To overcome this major disadvantage and to obtain a non-stick coating whose mechanical properties are reinforced, it is known to the person skilled in the art to form a multilayer non-stick coating whose first layer, starting from the bottom of the utensil (commonly known as the "primer layer") and acting as binding layer for one or more upper layers of the non-stick coating (commonly called the "top layers"), in addition to the sintered fluorocarbon resin, contains a high quantity of mineral or hard organic fillers (for example, silica, quartz or aluminium).

However, this type of reinforcement necessarily remains limited since the filler content in the primer layer cannot exceed a few percent by weight of the total weight of the primer layer. Over and above a certain threshold quantity of filler, typically over and above 15% by weight of filler in the primer layer, this layer may lose its cohesion.

In addition, it is also known to the person skilled in the art to form a hard sub-layer or a hard base between the substrate (in this case, the inner surface of a cooking utensil) and the non-stick coating (notably the primer layer).

The forming of a hard sub-layer or hard base between the substrate and the non-stick coating not only allows the non-stick coating to be mechanically reinforced (notably in terms of hardness) but it also imparts high scratch resistance.

The sub-layer or hard base forms a barrier which prevents scratches from reaching the surface of the substrate.

Hard sub-layers are known formed by a polymer such as polyamide imide (PAI) and/or oxy-1,4-phenylene-oxy-1,4 phenylene-carbonyl-1,4-phenylene (PEEK) as taught in international applications WO 00/54895 and WO 00/54896 on behalf of the applicant.

Also, hard bases in metal or alumina are known. If the hard base is formed of alumina, it can be deposited by heat spraying onto the substrate here consisting of the inner surface of the bottom of the utensil. In the particular case of a substrate in aluminium or aluminium alloy, a hard base in alumina can also be formed directly on the substrate by anode oxidation thereof. For example, European patent EP 0 902 105 describes a non-stick coating deposited on said hard base which has high scratch and abrasion resistance. However, this non-stick coating has the disadvantage of not being sufficiently resistant to corrosion or to separation (cleavage). In addition, the forming of alumina, in particular using the so-called hard anodization process, is very costly from an energy viewpoint since high electric powers must be provided to maintain low temperatures in the anodizing baths.

A hard metallic base is also known which is formed on the inner surface of a cooking utensil to reinforce the non-stick coating layer. For example, U.S. Pat. No. 5,455,102 describes a cooking utensil comprising a metal body sheet whose inner roughened surface, starting from the bottom of the body sheet, is successively coated with a hard metal layer (notably in steel, copper or aluminium) which is scratch-resistant and a lubricating layer essentially consisting of PTFE. The hard scratch-resistant layer has a thickness of between 40 and 90 μm with a mean arithmetic roughness (Ra) of between 5 μm and 8 μm. The lubricating layer in PTFE is applied using known spray techniques, while the hard scratch-resistant layer is formed by electric-arc spraying. The forming of said hard layer has the disadvantage, however, of requiring the use of costly depositing equipment (electric arc) which is also energy-consuming and little productive. The use of a different metal is also a source of new difficulties by creating an electrolytic couple which generates weakening of corrosion resistance.

SUMMARY OF THE INVENTION

The applicant has now found that by forming a hard rough base in enamel, between the inner surface of the utensil and the non-stick coating, it is possible to obtain a non-stick coating which has both improved substrate-adhering properties and improved corrosion and scratch resistance properties without the need to use equipment that is complex, costly and energy-consuming and likely to generate corrosion.

More particularly, the subject of the present invention is a cooking utensil comprising a metal substrate having a concave inner surface intended to be arranged in the direction of food to be placed in said utensil, and a convex outer surface intended to be arranged in the direction of a heat source, said inner surface starting from said substrate being successively coated with a hard base, then a non-stick coating covering said hard base, said non-stick coating comprising at least one layer comprising at least one fluorocarbon resin alone or in a mixture with a heat-stable binder resin resistant to at least 200° C., this (these) resin(s) forming a continuous sintered network.

According to the invention, the hard base is a rough enamel layer comprising less than 50 ppm lead and less than 50 ppm cadmium, said enamel layer having the following characteristics. A hardness greater than that of the metal or metal alloy forming the substrate, a melting point lying between that of the metal or metal alloy forming the substrate and that of the sintered resin(s) of the non-stick coating, and a surface roughness Ra of between 2 μm and 50 μm.

Preferably, the melting point of the hard base 3 lies between a temperature that is 50° C. higher than the highest melting point of the sintered resins of the non-stick coating, and a temperature 10° C. lower than the melting point of the metal or metal alloy forming the substrate.

By surface roughness Ra in the meaning of the present invention is meant the mean arithmetic difference between the peaks and troughs of the surface relative to the median (or mean) line, this difference being estimated as per standard ISO 4287.

It is observed that said hard base arranged between the substrate and the non-stick coating leads to a significant improvement in the physical, chemical and mechanical performance of the non-stick coating.

For example, scratch-resistance is multiplied by at least five compared with the same non-stick coating without an enamelled hard base, whilst maintaining its non-stick properties.

According to a first embodiment of the invention, the hard base is a discontinuous layer comprising a surface dispersion of enamel droplets distributed homogeneously over the inner surface of the utensil, with a coating rate of the inner surface of between 40% and 80%, a surface density of between 300 droplets/mm$^2$ and 2,000 droplets/mm$^2$ and a droplet size of between 2 μm and 50 μm.

According to a second embodiment, the hard base is a continuous enamel layer entirely covering said inner surface of the substrate and having a thickness of 50 μm or more.

For said embodiment, corrosion resistance is improved since said continuous hard base creates an anti-corrosion barrier against chemical attack by food, which protects the metal substrate in particular if it is a substrate in aluminium.

A further subject of the present invention is a method comprising the following steps:

a) supplying a substrate having the final shape of the cooking utensil with an inner concave surface intended to be arranged on the side of food to be placed in said utensil, and an outer convex surface intended to be arranged on the side of a heat source;

b) treating the surface of the inner face of the substrate to obtain a treated inner face adapted for the adhering of a hard base onto the substrate;

c) forming a hard base on the inner face of said substrate; then d) forming a non-stick coating on said hard layer formed during step c), comprising the depositing of at least one layer of a composition containing a fluorocarbon resin, then curing this layer at a temperature of between 370° C. and 430° C., preferably in the order of 415° C.

According to the invention, step c) to form the hard base comprises the following successive steps:

c1) preparing an aqueous slip of enamel frit, said enamel frit comprising less than 50 ppm cadmium and less than 50 ppm lead, and containing 30 to 40% by weight of silica and 15 to 30% by weight of titanium oxide, less than 10% by weight of vanadium oxide and less than 4% by weight of lithium oxide relative to the total weight of the frit, said aqueous slip containing at least 20% by weight of mineral fillers relative to the total weight of the slip;

c2) applying the aqueous slip formed at step c1) by spraying the slip onto the inner face of the substrate, then drying to form a non-cured enamel layer;

c3) curing said enamel layer at a temperature of between 540 and 580° C. for at least 3 minutes, the curing of the enamel layer being conducted before the curing of the non-stick coating.

Unlike an electric-arc or plasma spraying process, in the present invention, a homogenous compound is not applied whose structure after hardening is determined by its initial chemical composition before hardening. In the present invention, an aqueous slip of enamel frit is applied and it is observed that during curing the different fusible elements of the slip are seen to homogenize, those elements derived from the enamel frit and those derived from its slip formulation. In the present invention, there is not any unequivocal correspondence therefore between the composition of the slip and the structure of the enamel formed after application and curing of this slip.

Since the enamel of the hard base has a high melting point, lying between that of the sintered resin(s) of the non-stick coating and that of the constituent material of the metal substrate, the curing of the enamel layer must necessarily be carried out before the forming of the non-stick coating, since the curing of the hard enamelled base must be performed at a high temperature, which is generally between 540 and 580° C. to ensure good cohesion of the enamel. Yet, at this temperature level, there is a high risk that the fluorocarbon resin, and optionally the heat-stable resin, may be highly degraded or pyrolyzed. It is therefore not possible to obtain a cooking utensil according to the invention with a single curing step for the simultaneous curing of the hard enamelled base and of the non-stick coating.

The method of the invention has the advantage of using an aqueous slip of enamel frit which does not comprise any solvents and therefore does not generate any VOCs, and the enamel frit used in the method of the invention contains practically no harmful elements such as lead or cadmium or only traces thereof (no more than 50 ppm of a harmful element) so that the enamel thus obtained pays heed to legislation in the food sector both regarding the formulation of the enamel frit and regarding the formulation of the slip.

BRIEF DESCRIPTION OF THE DRAWINGS

Other advantages and aspects of the present invention will become apparent from the following description given as a non-limiting example and with reference to the appended figures.

DETAILED DESCRIPTION OF THE INVENTION

Figure 1:
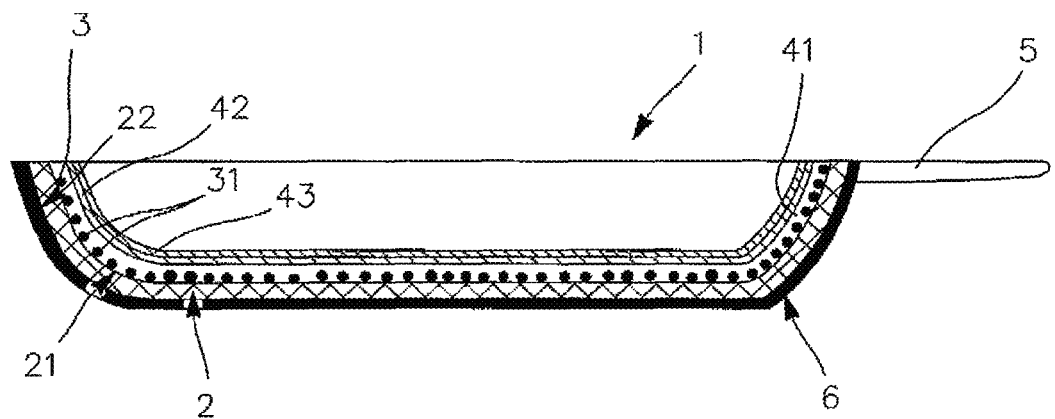
FIG. 1 is a schematic cross-sectional view of a cooking utensil conforming to the invention according to a first variant of embodiment.
Figure 2:
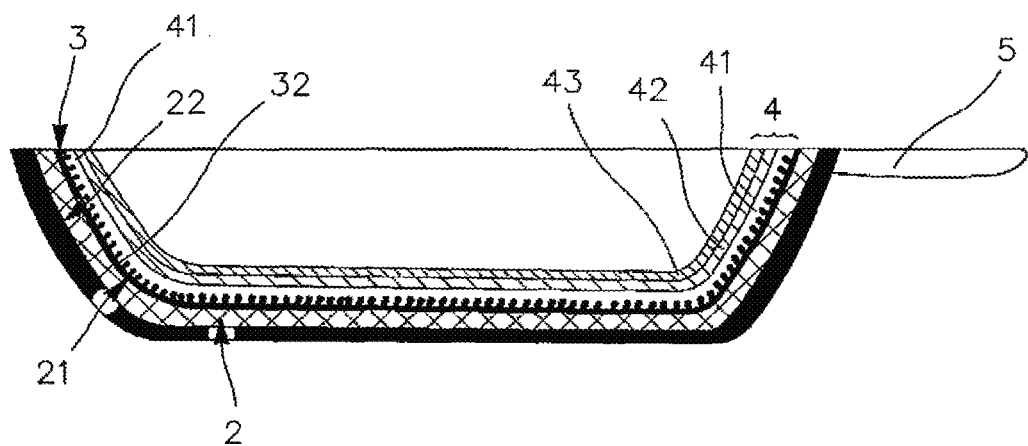
FIG. 2 is a schematic cross-sectional view of a cooking utensil conforming to the invention according to a second variant of embodiment.

Identical elements depicted in FIGS. 1 and 2 are identified by identical reference numbers.

In FIGS. 1 and 2, an exemplary cooking utensil according to the invention is illustrated: a frying-pan 1 comprising a metal substrate 2 in the form of a hollow body sheet and a grasping handle 5. The substrate 2 comprises an inner face 21 which is the face on the side of the food to be placed in the frying-pan 1, and an outer face 22 which is intended to be arranged towards an external heat source.

The inner face 21, starting from the substrate 2, is successively coated with a hard base 3 in enamel conforming to the present invention, and a non-stick coating 4 which successively comprises, starting from the hard base 3, a binding primer layer 41 and two top layers 42, 43.

Additionally, FIGS. 1 and 2 also show that the outer face 22 of the substrate 2 is advantageously coated with an outer coat 6 (e.g. in enamel), the thickness of this outer coat 6 conventionally ranging from 20 µm to 300 µm.

The metal body sheet 2 acting as substrate is advantageously in aluminium or in aluminium alloy, in cast aluminium (or cast aluminium alloy), in stainless steel, in cast steel or in copper.

As aluminium alloys which may be used to form the substrate of the cooking utensil 1, according to the invention, low aluminium alloys suitable for enamelling are recommended and in particular, "pure" aluminium containing 99% aluminium in the 1000 series, for example the alloys 1050, 1100, 1200 and 1350, alloys of aluminium and manganese in the 3000 series, for example the alloys 3003, 3004, 3105 and 3005, the alloys of aluminium and silicon in the 4000 series, alloys of aluminium and magnesium of the 5000 series, for example the alloys 5005, 5050 and 5052, and alloys of aluminium, silicon and magnesium in the 6000 series, for example alloys 6053, 6060, 6063, 6101 and 6951, and alloys of aluminium, iron, silicon in the 8000 series, for example alloy 8128.

As cast aluminium alloys which can be used for the substrate 2 (body sheet) of the cooking utensil 1, aluminium-silicon alloys AS are recommended and preferably the aluminium-silicon alloys of AS7 to AS12 type i.e. AS alloys containing 7 to 12% silicon conforming to former French standard NF AS 02-004.

The primer layer 41 and the top layers 42, 43 each comprise at least one sintered fluorocarbon resin, either alone or in a mixture with a heat-stable binder resin resistant to at least 200° C., which form a continuous sintered network of fluorocarbon resin, and optionally binder resin.

The fluorocarbon resin used for the primer layer 41 and optionally the top layer(s) 42, 43 is advantageously chosen from among polytetrafluoroethylene (PTFE), the copolymer of tetrafluoroethylene and perfluoropropylvinylether (PFA), the copolymer of tetrafluoroethylene and hexafluoropropylene (FEP) and their mixtures (in particular a mixture of PTFE and PFA).

The other resin(s) used in the primer layer 41 and optionally the top layer(s) 42, 43 is advantageously chosen from among the polyamide-imides (PAIs), polyether-imides (PEIs), polyimides (PIs), polyetherketones (PEKs), polyetheretherketones (PEEKs), polyethersulphones (PESs) and polyphenylene sulphides (PPSs).

The primer layer 41 may also advantageously comprise fillers and/or pigments.

As fillers which can be used in the primer composition of the cooking utensil 1 according to the invention, particular mention may be made of colloidal silica, $TiO_2$-coated mica flakes, alumina, corundum, quartz and their mixtures.

As pigments which can be used in the primer composition of the cooking utensil 1 according to the invention, particular mention may be made of carbon black, iron oxides, mixed cobalt and manganese oxides, titania dioxide.

In the variant of embodiment illustrated FIG. 1, the hard base 3 is a discontinuous layer of enamel comprising a surface dispersion of solidified enamel droplets 31 having a mean size of between 2 µm and 50 µm which are distributed homogeneously over the surface of the inner face 21, with an inner face coating rate of between 40 and 80%, and a surface density of between 300 droplets/$mm^2$ and 2,000 droplets/$mm^2$.

By surface dispersion of enamel droplets in the meaning of the present invention is meant a discontinuous layer of enamel present in divided state on a substrate (here the substrate of the cooking utensil) so that the roughness of this layer is created by the dispersed enamel droplets.

By substrate coating rate in the meaning of the present invention is meant the ratio, expressed as a percentage, of the surface of the substrate effectively coated with the surface dispersion of enamel droplets to the total surface area of the substrate able to be coated with the hard base.

In the variant of embodiment shown in FIG. 1, the enamel droplets 31 dispersed on the surface of the inner face 21 are embedded in the primer layer 41 of the non-stick coating 4 so as to allow the binding of the primer layer to the hard base 3 in enamel. Said enamelled hard base 3 in the form of a surface dispersion of enamel droplets leads to increased mechanical resistance of the non-stick coating 4, notably in terms of hardness and adherence to the underlying hard base 3.

The particles of sintered fluorocarbon resin and the fillers of the primer layer 41, by penetrating between the solidified enamel droplets 31 deposited on the surface of the inner face 21, effectively reinforce the adherence of the primer layer 41 onto the hard base 3. On this account, the mechanical reinforcement of the non-stick coating 4 is increased both by means of the fillers in the primer layer 41 and by the dispersion of the enamel droplets 31 of the hard base 3 which play a similar role to the role played by a reinforcing filler in the inter-penetration region of the two layers 3, 41.

Preferably, the hard base 3 of the variant of embodiment of the cooking utensil according to the invention illustrated in FIG. 1 has a surface roughness Ra of between 2 µm and 15 µm, preferably between 8 µm and 15 µm.

A roughness of more than 15 µm would result in a non-stick coating 4, over this rough surface, that is no longer smooth.

In the variant of embodiment illustrated in FIG. 2, the hard base 3 is a continuous layer of enamel 32 entirely covering the inner face 21 of the substrate 2 (coating rate of 100%) and having a thickness of between 50 µm and 100 µm. Since in this second embodiment the hard base 3 is continuous, the surface roughness here is not created by the surface dispersion of solidified enamel droplets as is the case in the first variant of embodiment, but by peaks and troughs formed on the surface of the hard base 3 due to the presence of infusible fillers in the composition of the enamel of the hard base 3.

Said layer 3 advantageously has a surface roughness Ra of between 2 and 8 µm.

With a surface roughness Ra of between 2 and 8 µm, there is good adherence of the non-stick coating 4 onto the hard base 3, leading to high scratch-resistance without any loss of non-stick properties.

On the other hand, with a surface roughness Ra of less than 2 µm, the adherence of the non-stick coating onto the hard base is too low.

Also, for a surface roughness Ra of more than 8 µm, scratch-resistance and the non-stick properties of the non-stick coating will also be low.

Since the non-stick coating generally has a thickness in the order of 25 µm to 45 µm, it is probable that the presence of peaks generated by the solidified enamel droplets is not levelled by the non-stick coating 4.

Two embodiments are given below of a cooking utensil 1 conforming to the invention according to the first variant of embodiment, which each comprise the following steps:

a) providing a substrate 2, having the final shape of the cooking utensil and an inner face 21 intended to be arranged on the side of the food to be placed in said utensil 1, and an outer face 22 intended to be arranged on the side of a heat source;

b) preparing the surface of the inner face 21;

c) forming a hard base 3 on said inner face 21 of said substrate 2, then d) forming a non-stick coating 4 on the hard layer 3 formed at step c), comprising the depositing of at least one layer of composition containing a fluorocarbon resin, then curing this layer at a temperature of between 370° C. and 430° C. and preferably at a temperature in the order of 415° C.

For these two embodiments, step c) to form the hard base 3 comprises the following successive steps:

c1) preparing an aqueous slip of enamel frit, said enamel frit having less than 50 ppm lead and less than 50 ppm cadmium, and containing 30 to 40% by weight of silica and 15 to 30% by weight of titanium oxide, less than 10% by weight of vanadium oxide and less than 4% by weight of lithium oxide relative to the total weight of the frit, said aqueous slip containing at least 20% by weight of mineral fillers relative to the total weight of the slip;

c2) applying the slip by air-assisted spraying to the face 21 of the substrate 2, then drying to form a discontinuous or continuous layer 3 of non-cured enamel;

c3) curing said enamel layer 3 at a temperature of between 540 and 580° C. for at least 3 minutes, the curing of said enamel layer 3 being conducted before the curing of said non-stick coating 4.

Advantageously, the enamel frit comprises:

| | |
|---|---|
| $Al_2O_3$: | less than 1% |
| $B_2O_3$: | less than 1% |
| BaO: | less than 1% |
| $K_2O$: | 5 to 20% |
| $Li_2O$: | less than 4% |
| $Na_2O$: | 10 to 25% |
| $P_2O_5$: | less than 4% |
| $SiO_2$: | 30 to 40% |
| $TiO_2$: | 15 to 30% |
| $V_2O_5$: | less than 10%, | the indicated contents being weight percentages relative to the weight of the frit.

Advantageously, the slip of enamel frit also comprises:

| | |
|---|---|
| quartz: | 5 to 30% |
| SiC: | 10 to 30% |
| Pigment: | 1 to 10% |
| Suspension agent: | 2 to 10%, | the indicated contents being weight percentages relative to the total weight of the slip.

To implement the first variant of the cooking utensil 1 according to the invention (hard base 3 in discontinuous enamel), the application of the slip to the inner face 21 of the substrate 2 is performed by air-assisted spraying with a spray pressure of 4 bars or more and the quantity of enamel deposited on said inner face 21 lies between 0.07 g/dm² and 0.2 g/dm².

To implement the second variant of the cooking utensil according to the invention (hard base in continuous enamel), the application of the slip to the inner face 21 of the substrate 2 is conducted by air-assisted spraying with a spray pressure of between 2 and 5 bars and the quantity of enamel deposited on said inner face 21 lies between 1.5 g/dm² and 2.8 g/dm².

For these two embodiments of the method according to the invention, the surface preparation step can be preceded by a degreasing step followed by mechanical treatment such as sanding, beading or shot-peening.

It is also possible to prepare the surface of the inner face 21 of the substrate by chemical surface treatment comprising a degreasing phase, followed by satin-finishing and then rinsing.

EXAMPLES

Example 1

Preparation of an enamel frit F1 conforming to the enamel frit used in the method of the invention.

An enamel frit F1 was prepared conforming to the enamel frit used in the method of the invention, by melting the following constituents at 1,200° C.:

| | |
|---|---|
| $Al_2O_3$: | 0.1% |
| $B_2O_3$: | 0.6% |
| BaO: | 0.3% |
| $K_2O$: | 12.0% |
| $Li_2O$: | 2.3% |
| $Na_2O$: | 19.0% |
| $P_2O_5$: | 1.6% |
| $SiO_2$: | 35.0% |
| $TiO_2$: | 23.5% |
| $V_2O_5$: | 5.2%. |

The obtained melted mixture is then crushed to give a powder frit F1 having a mean size of 15 μm and a linear coefficient of $494.10^{-7}$ m·K$^{-1}$.

Example 2

Preparation of a first example of a slip B1 of enamel frit conforming to the slip used in the method of the invention.

The enamel frit F1 is formulated in the form of a slip B1 by mixing the following constituents (parts by weight):

| | |
|---|---|
| Enamel frit F1: | 70 |
| Water: | 55 |
| Quartz: | 25 |
| SiC: | 23 |
| Black pigment containing Fe and Mn oxides: | 5 |
| Boric acid: | 4. |

The slip B1 thus obtained has a density of 1.70 g/cm³ and a set-up of 1,300 g/m².

By set-up is meant herein the quantity of matter required for uniform covering after application to a given surface.

Example 3

Forming of a non-stick coating R1 conforming to the coating of the present invention.

To form a non-stick coating R1 conforming to the invention, compositions of the different layers of this coating R1 are given below as examples. These layers are obtained by simple mixing of the different ingredients of these compositions which are given in Tables 1 to 3.

TABLE 1

| Composition of the primer layer | Parts by weight |
|---|---|
| Aqueous dispersion of polyamide-imide, about 10% dry extract | 37.1 |
| N. Methylpyrrolidone | 6.5 |
| Set-up and film-forming agents (14% in water) | 4.0 |
| PTFE dispersion, 60% dry extract | 21.2 |
| Colloidal silica, 30% dry extract | 13.9 |
| Carbon black, 25% dry extract | 2.8 |
| Water | 14.0 |
| NaOH (d = 0.9) | 0.5 |

Said composition has a viscosity of 45±2 seconds measured using an AFNOR 2.5 flow cup and dry extract of 21%.

TABLE 2

| Composition of the intermediate top layer | Parts by weight |
|---|---|
| PTFE dispersion, 60% dry extract | 78.9 |
| PFA 6900 dispersion, 50% dry extract | 0.5 |
| Set-up and film-forming agent | 19.25 |
| $TiO_2$-coated mica flakes | 0.2 |
| Carbon black, 25% dry extract | 0.02 |
| Propylene glycol | 1.13 |

Said composition has a viscosity of 45±2 seconds measured with an AFNOR 2.5 flow cup and dry extract of 47.5%.

TABLE 3

| Composition of the upper top layer | Parts by weight |
|---|---|
| PTFE dispersion, 60% dry extract | 78.9 |
| Set-up and film-forming agent | 19.3 |
| $TiO_2$-coated mica flakes | 0.2 |
| Propylene glycol | 1.65 |

Said composition has a viscosity of 45±2 seconds measured using an AFNOR flow cup and dry extract of 47.5%.

Example 4

Obtaining a first example of a cooking utensil according to the invention, having a continuous hard base.

As substrate a body sheet in aluminium is used, obtained by forming a disk in aluminium (of 1200 type), the body sheet thus formed having a base with a diameter of about 28 cm.

This body sheet is degreased by spraying an alkaline solution, then satin-finished by immersion in a sodium hydroxide bath, and finally neutralized with nitric acid, rinsed and dried.

Next, using an air gun, the slip B1 of Example 2 is applied to form a continuous layer. The body sheet thus coated is dried at a temperature of 140° C. and then vitrified at 555° C. for 5 minutes to obtain a hard, continuous base of 50 μm thickness. The roughness Ra of this hard base is 8 μm.

After cooling this hard base, the non-stick coating R1 is formed by successively applying to the hard enamelled base the primer layer, the intermediate top layer and the upper top layer (top coat) of Example 3, each layer respectively being dried at 140° C. and the whole cured at 415° C. for 7 minutes to obtain the non-stick coating R1 of Example 3.

In this manner, a first example of a frying-pan 1 according to the invention is obtained (new condition).

The adherence of the non-stick coating R1 to the hard base is assessed by performing an adherence cross-cut test as per standard ISO 2409, followed by immersion of the utensil for 9 hours in boiling water. The non-stick coating shows no separation. This resistance to separation from the substrate is excellent.

The non-stick characteristics of the R1 non-stick coating are then assessed using the burnt milk test as per standard NF D 21-511. On the frying-pan 1 in new condition, excellent non-stick properties are observed (score of 100 points according to standard NF D 21-511).

The scratch-resistance of the R1 non-stick coating is assessed by subjecting it to the action of a green scouring pad of SCOTCH BRITE type (registered trademark). Simultaneously, the non-stick properties of the R1 non-stick coating are assessed using the burnt milk test. The following performance levels were obtained:

for scratch-resistance the first scratch (corresponding to exposure of the constituent metal of the substrate) is observed visually (optical magnification×8) after 20,000 passes of the pad.

for non-stick properties excellent non-stick properties are obtained for the R1 coating (score of 100 points according standard NF D 21-511) after 3,000 passes of the scouring pad, and acceptable resistance to separation (score of at least 25 points according to standard NF D 21-511) after 20,000 passes of the scouring pad.

Finally resistance to corrosion is assessed by immersion of the cooking utensil in a 10 g/l saline bath held at 80° C. for 24 hours. The surface of the non-stick coating does not show any blistering or deterioration.

Example 5

Preparation of a second example of slip B2 of enamel frit conforming to the slip used in the method of the invention.

The enamel frit F1 is formulated as a slip B2 by mixing the following constituents (parts by weight):

| | |
|---|---|
| Above enamel frit: | 85 |
| Water: | 55 |
| Quartz: | 15 |
| SiC: | 23 |
| Black pigment FA1220: | 5 |
| Boric acid: | 4. |

The slip has a density of 1.70 g/cm³ and a set-up of 1,300 g/m².

Example 6

Obtaining a second example of a cooking utensil according to the invention, with discontinuous hard base.

The same substrate as in Example 4 is used, namely a hollow body sheet in aluminium of type 1200, which is degreased by spraying an alkaline solution, satin-finished by immersion in a sodium hydroxide bath, then neutralized with nitric acid, rinsed and dried.

Next, as in Example 4, an air gun is used to apply the slip B2 to obtain depositing of a discontinuous enamel layer in the form of non-contiguous droplets. The body sheet thus coated with a discontinuous hard base is dried at 140° C. then vitrified at 555° C. for 5 minutes to obtain a discontinuous layer of weight 0.9 g.

Under microscopy observation, the size of the droplets and their surface density are determined. The droplet size ranges from 2 to 50 μm and the surface density is in the order of 1,500 droplets/mm². The roughness Ra of the layer is measured and the result obtained is Ra=15 μm.

After cooling the enamelled hard base, the following are successively applied to the hard base: the primer layer, intermediate top layer and upper top layer (top coat) of Example 3, each layer respectively being dried at 140° C. and the whole being cured at 415° C. for 7 minutes to obtain the non-stick coat R1 of Example 3. A second example of a frying-pan is obtained according to the invention (new condition).

The adherence of the non-stick coating to the hard base is assessed using the cross-cut adherence test according to standard ISO 2409 followed by immersion of the frying-pan 1 in boiling water for 9 hours. The non-stick coating does not show any separation. The adherence to the substrate is excellent.

The non-stick characteristics of the non-stick coating R1 are then assessed using the burnt milk test in accordance with standard NF D 21-511. On the frying-pan 1 in new condition excellent non-stick properties are observed (score of 100 points according to standard NF D 21-511).

The scratch resistance of the non-stick coating R1 is assessed by subjecting it to the action of a green scouring pad of SCOTCH BRITE type (registered trademark). Simultaneously, the non-stick properties of the non-stick coating R1 are assessed using the burnt milk test. The following performance levels were obtained:

for scratch resistance
the first scratch (corresponding to exposure of the constituent metal of the substrate) is observed visually (optical magnification×8) after 15,000 passes of the pad.

for non-stick properties
excellent non-stick properties are obtained for the R1 coating (score of 100 points according to standard NF D 21-511) after 3,000 passes of the scouring pad, and acceptable adherence (score of at least 25 points according to standard NF D 21-511) after 15,000 passes of the scouring pad.

Example 7

Preparation of a third example B3 of slip of enamel frit conforming to the slip used in the method of the invention.

The enamel frit F1 is formulated in the form of a slip B3 by mixing the following constituents (parts by weight):

| | |
|---|---|
| Above enamel frit: | 85 |
| Water: | 55 |
| Quartz: | 8 |
| SiC: | 23 |
| Black pigment FA1220: | 5 |
| Boric acid: | 4. |

The slip has a density of 1.70 g/cm$^3$ and a set-up of 1,300 g/m$^2$.

Example 8

Obtaining a third example of a cooking utensil according to the invention, with discontinuous hard base.

The same substrate is used as in Example 4, namely a hollow body sheet in aluminium of type 1200, which is degreased by spraying with an alkaline solution, satin-finished by immersion in a sodium hydroxide bath, then neutralized with nitric acid, rinsed and dried.

Then, as in Example 4 and using an air gun, the slip B3 is applied to obtain the depositing of a discontinuous enamel layer in the form of non-contiguous droplets. The body sheet thus coated with a discontinuous hard base is dried at 140° C. and vitrified at 555° C. for 5 minutes to obtain a discontinuous layer of weight 0.9 g.

Under microscopy observation, the size of the droplets and their surface density are determined. The droplet size lies between 2 and 30 µm and their surface density is in the order of 1,500 droplets/mm$^2$. The roughness Ra of the layer is measured and the result obtained is Ra=6.5 µm.

After cooling the hard enamelled base, the following are successively applied to the hard base: the primer layer, intermediate top layer and upper top layer (top coat) of Example 3, each layer respectively being dried at 140° C. and the whole cured at 415° C. for 7 minutes to obtain the non-stick coating R1 of Example 3. A second example of a frying-pan according to the invention is obtained (new condition).

The adherence of the non-stick coating to the hard base is assessed using the cross-cut adherence test as per standard ISO 2409 followed by immersion of the frying-pan 1 in boiling water for 9 hours. The non-stick coating does not show any separation. Adherence to the substrate is excellent.

Next, the non-stick characteristics of the non-stick coating R1 are assessed using the burnt milk test as per standard NF D 21-511. On the frying-pan 1 in new condition, excellent non-stick properties are observed (score of 100 points according to standard NF D 21-511).

The scratch resistance of the non-stick coating R1 is assessed by subjecting it to the action of a green scouring pad of SCOTCH BRITE type (registered trademark). Simultaneously the non-stick properties of non-stick coating R1 are assessed using the burnt milk test. The following performance levels were obtained:

for scratch resistance
the first scratch (corresponding to exposure of the constituent metal of the substrate) is observed visually (optical magnification×8) after 16,000 passes of the scouring pad.

for non-stick properties
excellent non-stick properties are obtained for coating R1 (score of 100 points according to standard NF D 21-511) after 3,000 passes of the scouring pad, and acceptable adherence (score of at least 25 points according to standard NF D 21-511) after 16,000 passes of the scouring pad.

Example 9

Comparative Example

Obtaining an example of a cooking utensil according to the prior art (with no hard base).

The same substrate is used as in Example 4, namely a hollow body sheet in aluminium of type 1200, which is degreased by spraying with an alkaline solution, stain-finished by immersion in a sodium hydroxide bath, then neutralized with nitric acid, rinsed and dried.

On this body sheet are successively applied the primer layer, intermediate top layer and upper top layer (top coat) of Example 3, each layer respectively being dried at 140° C. and the whole cured at 415° C. for 7 minutes to obtain the non-stick coating R1 of Example 3 to form the non-stick coating R1.

In this manner, an example of a prior art frying-pan is obtained (new condition).

The adherence of the non-stick coating 1 to the hard base is assessed using the cross-cut adherence test as per standard ISO 2409 followed by immersion of the utensil in boiling water for 9 hours. The non-stick coating shows separation in more than 20 cross-cuts. This adherence to the substrate is insufficient.

Next, the non-stick characteristics of the non-stick coating R1 are assessed using the burnt milk test according to standard NF D 21-511. On the frying-pan 1 in new condition, excellent non-stick properties are observed (score of 100 points according to standard NF D 21-511).

Next the scratch resistance of the non-stick coating R1 is assessed by subjecting it to the action of a green scouring pad of SCOTCH BRITE type (registered trademark). Simultaneously the non-stick properties of the non-stick coating R1 are assessed using the burnt milk test. The following performance levels are obtained:

for scratch resistance the first scratch (corresponding to exposure of the constituent metal of the substrate) is observed visually (optical magnification×8) after only 3,000 passes of the scouring pad.

for non-stick properties no non-stick properties of the coating R1 are obtained (score of 0 points according to standard NF D 21-511) after only 3,000 passes of the scouring pad.

Finally, corrosion resistance is assessed by immersion of the cooking utensil in a 10 g/l salt water bath held at 80° C. for 24 hours. The non-stick coating surface shows extensive blistering.

What is claimed is:

1. A cooking utensil comprising:
    a metal substrate having a concave inner face intended to be arranged on a side in which food is to be placed in the utensil and a convex outer face intended to be arranged towards a heat source;
    a hard base coating on the inner face; and
    a non-stick coating covering the hard base, the non-stick coating comprising at least one layer comprising at least one fluorocarbon resin alone or in a mixture with a heat-stable binder resin resistant to at least 200° C., the non-stick coating forming a continuous sintered network,
    wherein the hard base is a rough layer of enamel containing less than 50 ppm lead and less than 50 ppm cadmium, having the following characteristics:
        a hardness greater than that of the metal or metal alloy forming the substrate,
        a melting point between that of the metal or metal alloy forming the substrate and that of the sintered resin(s) of the non-stick coating, and
        a surface roughness of between 2 and 50 µm.

2. The cooking utensil according to claim 1, wherein the enamel layer is in contact with the substrate and with the non-stick coating, and is therefore obtained from an aqueous slip of enamel frit which, in addition to the frit, comprises:
    5 to 30% by weight of quartz,
    1 to 10% by weight of pigment, and
    2 to 10% by weight of a suspension agent,
the indicated contents being weight percentages relative to a weight of the frit.

3. The cooking utensil according to claim 1, wherein the enamel layer is obtained from an aqueous slip of enamel frit, in which the enamel frit contains 30 to 40% by weight of silica and 15 to 30% by weight of titanium oxide, less than 10% by weight of vanadium oxide and less than 4% by weight of lithium oxide relative to a total weight of the frit.

4. The cooking utensil according to claim 1, wherein a melting point of the hard base is between a temperature 50° C. higher than a highest melting point of the sintered resins of the non-stick coating, and a temperature 10° C. lower than a melting point of the constituent metal or metal alloy of the substrate.

5. The cooking utensil according to claim 1, wherein the hard base is a discontinuous layer comprising a surface dispersion of enamel droplets distributed homogeneously over the inner face of the utensil, with a coating rate of the inner face of between 40% and 80%, a surface density of between 300 droplets/mm$^2$ and 2,000 droplets/mm$^2$ and a droplet size of between 2 µm and 50 µm.

6. The cooking utensil according to claim 5, wherein the hard base has a surface roughness of between 2 µm and 15 µm.

7. The cooking utensil according to claim 6, wherein the hard base has a surface roughness of between 8 µm and 15 µm.

8. The cooking utensil according to claim 1, wherein the hard base is a continuous layer of enamel entirely covering the inner face of the substrate and having a thickness of 50 µm or more.

9. The cooking utensil according to claim 8, wherein the hard base has a surface roughness of between 2 µm and 8 µm.

10. The cooking utensil according to claim 1, wherein the fluorocarbon resin is chosen from among polytetrafluoroethylene (PTFE), a copolymer of tetrafluoroethylene and perfluoropropylvinylether (PFA) and a copolymer of tetrafluoroethylene and hexafluoropropylene (FEP) and their mixtures.

11. The cooking utensil according to claim 1, wherein the binder resin is chosen from among polyamide imides (PAIS), polyether imides (PEIs), polyamides (PIs), polyetherketones (PEKs), polyetheretherketones (PEEKs), polyethersulphones (PESs) and polyphenylene sulphides (PPSs).

12. The cooking utensil according to claim 1, wherein the non-stick coating comprises a primer binding layer and at least one top layer, the primer layer and the at least one top layers, in addition to the continuous sintered network of fluorocarbon resin and optional binder resin, comprising at least one of a mineral filler, a organic filler, and a pigment.

13. The cooking utensil according to claim 12, wherein the substrate is an aluminium or aluminium alloy, a cast aluminium, a stainless steel, a cast steel or a copper.

14. A method to manufacture a cooking utensil comprising the following steps:
    a) supplying a substrate having a final shape of the cooking utensil with an inner concave surface intended to be arranged on a side in which food is to be placed in the utensil, and an outer convex surface intended to be arranged on a side of a heat source;
    b) treating the inner concave surface to obtain a treated inner face adapted for the adhering of a hard base onto the substrate;
    c) forming a hard base adhering to the inner face of the substrate; then
    d) forming a non-stick coating on the hard base formed during step c), comprising the depositing of at least one layer of a composition containing a fluorocarbon resin, and then curing this layer at a temperature of between 370° C. and 430° C.;
wherein step c) comprises the following successive steps:
    c1) preparing an aqueous slip of enamel frit, the enamel frit being devoid of lead and cadmium having less than 50 ppm lead and less than 50 ppm cadmium, and containing 30 to 40% by weight of silica and 15 to 30% by weight of titanium oxide, less than 10% by weight of vanadium oxide and less than 4% by weight of lithium oxide relative to a total weight of the frit, the aqueous slip containing at least 20% by weight of mineral fillers relative to a total weight of the slip;
    c2) applying the aqueous slip by spraying the slip onto the inner face of the substrate, then drying to form a non-cured enamel layer of homogeneous composition over an entire thickness of the enamel layer;

c3) curing the enamel layer at a temperature of between 540° C. and 580° C. for at least 3 minutes, the curing of the enamel layer being conducted before the curing of the non-stick coating.

15. The method according to claim 14, wherein the slip of enamel frit further comprises:

| | |
|---|---|
| quartz: | 5 to 30% |
| SiC: | 10 to 30% |
| Pigment: | 1 to 10% |
| Suspension agent: | 2 to 10% | the indicated contents being weight percentages relative to the weight of the frit.

16. The method according to claim 15, wherein the application of the slip to the inner face of the substrate is performed by air-assisted spraying with a spray pressure of 4 bars or more, and in that a quantity of enamel deposited on the inner face a between 0.07 g/dm² and 0.2 g/dm².

17. The method according to claim 14, wherein the application of the slip to the inner face of the substrate is conducted by air-assisted spraying with a spray pressure of between 2 and 5 bars, and in that a quantity of enamel deposited on the inner face a between 1.5 g/dm² and 2.8 g/dm².

18. The method according to any of claim 17, wherein the enamel frit comprises:

| | |
|---|---|
| $Al_2O_3$: | less than 1% |
| $B_2O_3$: | less than 1% |
| BaO: | less than 1% |
| $K_2O$: | 5 to 20% |
| $Li_2O$: | less than 4% |
| $Na_2O$: | 10 to 25% |
| $P_2O_5$: | less than 4% |
| $SiO_2$: | 30 to 40% |
| $TiO_2$: | 15 to 30% |
| $V_2O_5$: | less than 10%, | the indicated contents being weight percentages relative to the weight of the frit.

19. The method according to claim 14, wherein the surface preparation step c) which precedes the application c2) of the slip to the inner face of the substrate is a mechanical treatment step.

20. The method according to claim 14, wherein the surface preparation step is a chemical treatment step.

21. The method according to claim 14, wherein the substrate is a hollow body sheet.

* * * * *